April 4, 1939. F. W. MANNING 2,152,902
PROCESS OF CONTINUOUS DEPTH FILTRATION
Filed Sept. 18, 1936  3 Sheets-Sheet 1

INVENTOR
Fred W Manning

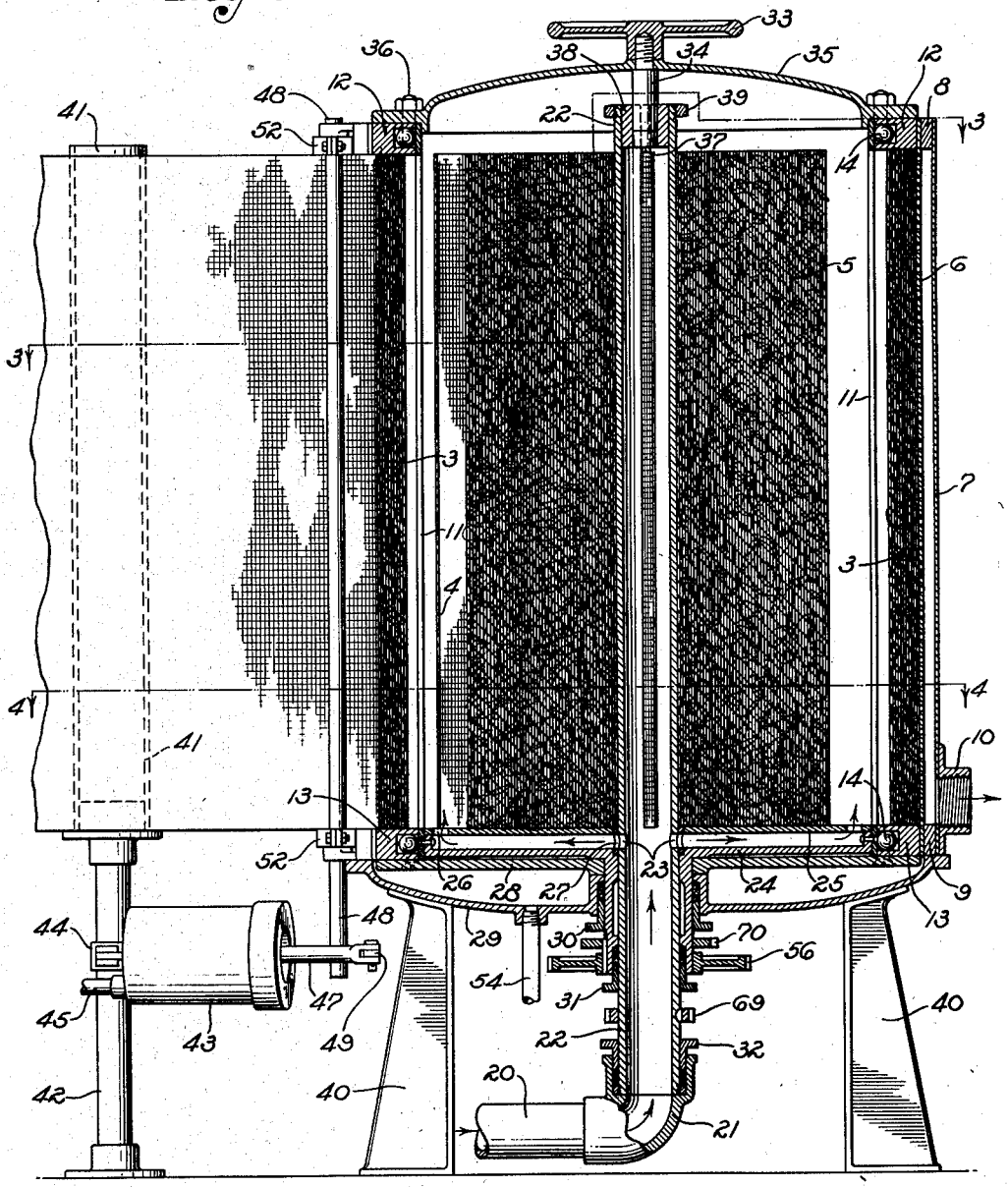

April 4, 1939.  F. W. MANNING  2,152,902
PROCESS OF CONTINUOUS DEPTH FILTRATION
Filed Sept. 18, 1936  3 Sheets-Sheet 3
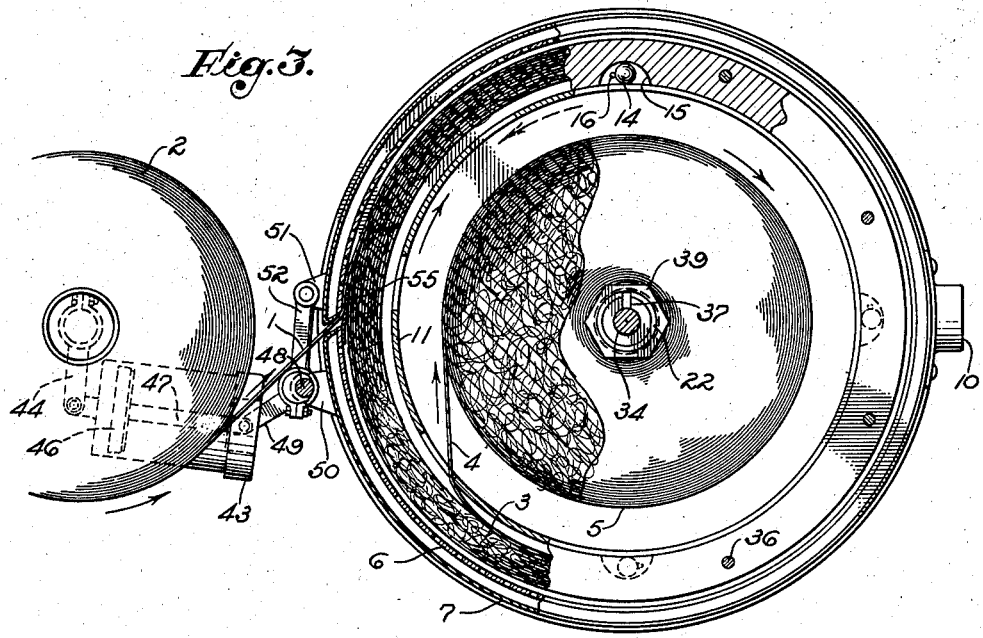
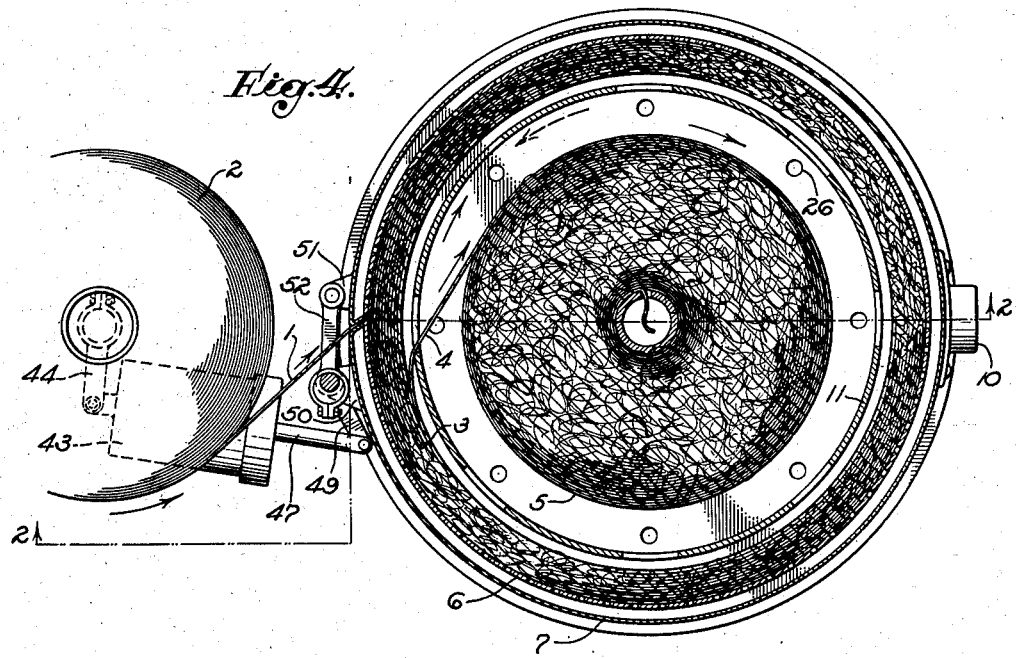
INVENTOR
Fred W Manning Patented Apr. 4, 1939

2,152,902

UNITED STATES PATENT OFFICE 2,152,902

PROCESS OF CONTINUOUS DEPTH FILTRATION

Fred W. Manning, Altadena, Calif., assignor to F. W. Manning Company, Ltd., Los Angeles, Calif., a corporation of California Application September 18, 1936, Serial No. 101,460

5 Claims. (Cl. 210—196)

This invention relates to a filtration process in which contiguous layers of filter fabric are moved continuously in one direction, while the fluid being treated filters therethrough in a counter direction; and is particularly adapted to the clarification of most fluids where filter aids have heretofore been required for precoating purposes. This application is a continuation-in-part of my co-pending application "Process of counter-current fabric filtration", Serial Number 750,460, filed October 29, 1934.

It has been the practice heretofore to accomplish the precoating of a filter by building up a considerable depth of diatomaceous earth on the surface of a foraminous retaining wall by passage of a conveying fluid through the wall. The filter bed thus formed was removed during the filtering operation by means of a knife advanced intermittently, or continuously, to remove a layer at a time. There are many objections to such methods. The flow rate and turbidity of the filtrate varies inversely with the depth of the filter bed; time, equipment, and constant agitation of the diatomaceous earth, are required to build up the precoat; the residual liquid in the precoat must sometimes be removed prior to the filtering operation; a filter bed of diatomaceous earth cannot be removed absolutely uniformly by means of a knife; the filter precoat can only be partly submerged, if it is to be removed by a knife slicing arrangement; and a filter precoat of non-compressible solids must usually be washed, and sometimes dried, before removal.

In order to avoid some of the above mentioned difficulties surface type filters, described by patent Nos. 2,055,872; 2,055,873; 2,055,874; and 2,055,927, dated September 29, 1936, were developed in which rolls of preformed layers of fibres are used instead of the usual precoating solids. Altho such rolls can be introduced into the filters in a dry state for immediate use, and the filters operated with the rolls in a completely submerged condition, and each layer of fibres removed uniformly as it becomes contaminated, yet the main objection to all "precoating" and "surface type" filters cannot be overcome unless the depth and porosity of the filter bed is maintained constant during the entire filtering operation.

The objects of the present invention are therefore to provide an improved method whereby the flow rate of the filtrate can be greatly increased by substituting "depth" filtration for "surface" filtration; both flow rate and clarity of the filtrate continuously maintained throughout the entire filtering operation; and the efficiency of the filter aid solids augmented by moving the layers in a direction counter to the flow of the liquid.

In accordance with my invention, a layer of fibres, bonded together to form a fabric, is removed from the fluid inlet surface of a filter bed of comparatively great depth and porosity whenever the bed becomes contaminated to a predetermined extent; and in suitably timed relation with each such removal of a contaminated layer, fresh fabric is passed from a reserve roll through a retaining wall onto the fluid outlet surface of the filter bed as the latter is moved relatively to the wall. The replenishing of the fluid outlet surface of the filter bed may alternate, or take place simultaneously, with the removal of the fluid inlet surface layer of the bed, and is accomplished by reducing the filter differential pressure and moving the filter bed relatively to a retaining wall, thereby causing fresh fabric from the supply roll to be drawn into position. The relative movement of the filter bed and a fixed retaining wall facilitated by the aid of a kick-back of the filtrate, as described in my co-pending application mentioned above, will cause the plurality of layers that make up the filter bed to be forced toward the fluid inlet surface of the bed. However, this relative movement of the filter bed and retaining wall may also be accomplished without placing an undue strain on the fabric or filter bed end joints, if the retaining wall is retracted away from the filter bed after a sufficient reduction of the differential pressure to relieve the pressure between the wall and the bed; and the movement of fresh layers toward the fluid inlet surface of the filter bed will result from a return movement of the retaining wall. The retraction of the retaining wall after reduction of the filter differential pressure need not be more than just sufficient to lift the openings in the wall from the pressed-in portions of the filter bed so that the latter may be moved along the wall. The amount of fresh fabric fed into filtering position, however, should be substantially equivalent to the amount of contaminated fabric removed, and the supply and removal may be determined by one revolution of the filter bed, or may continue for a predetermined interval controlled by a timing mechanism, and in either case may be repeated with sufficient frequency to maintain the filter pressure, or the filtrate head, or the filtrate flow rate, substantially constant.

The treating agent with which the scrim, or open mesh fabric, or assembly of reinforcing fibres or threads, is coated, may consist of cellulose, asbestos, hair, or other suitable fibrous materials of vegetable, mineral, or animal origin; and such compressible solids may be impregnated by, or mixed with, non-compressible treating solids such as fuller's earth, carbons, kieselguhr, salts of metals, etc., for decolorizing, catalyzing, combining with sulphur compounds, and for other purposes. The manufacture of such filter fabrics is described in my Patents Nos. 1,782,784 and 1,782,785, granted November 25, 1930; No. 1,786,669, granted December 30, 1930; and in my copending applications "Filter fabric," Serial No. 57,225, filed January 2, 1936; "Method of making filter fabric," Serial No. 99,634, filed September 5, 1936; and "Filter fabric manufacturing equipment," Serial No. 99,633, filed September 5, 1936.

The invention is exemplified in the following description, and one form of apparatus for carrying out the process is illustrated by way of example in the accompanying drawings, in which;

Fig. 2 is a vertical section of the filter taken on line 2—2 of Fig. 4.

Fig. 3 is a part cross-section and part plan view of the filter taken on line 3—3 of Fig. 2.

Fig. 4 is a cross-section of the filter taken on line 4—4 of Fig. 2.

Figure 1:
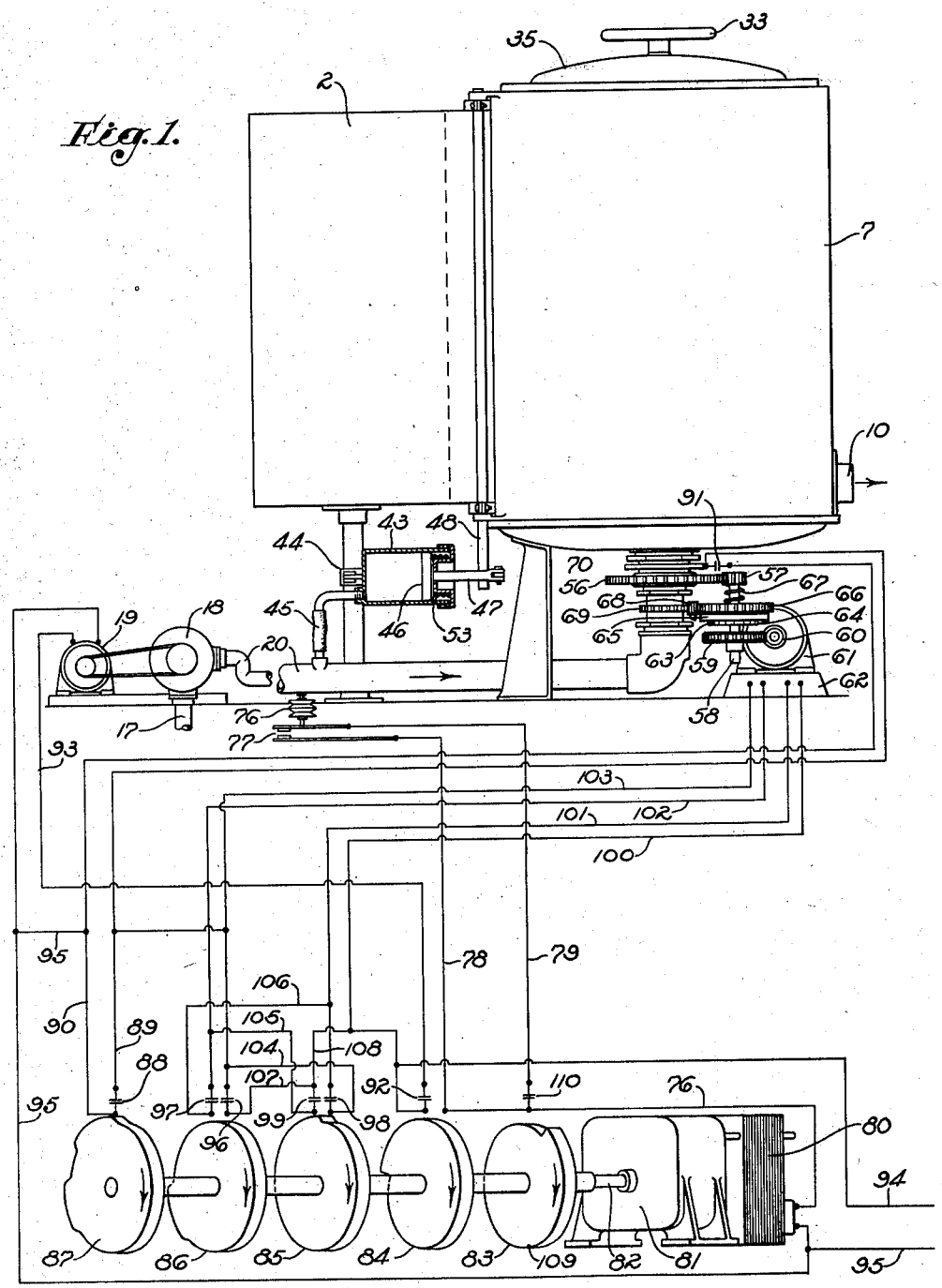
Fig. 1 is a diagrammatic arrangement of the filter and filter control mechanism.

Referring more specifically to the drawings by reference characters; a web 1, from the supply roll of filter fabric 2, is drawn through an opening in the retractable drainage housing onto the fluid outlet surface of the filter bed 3, and is ultimately removed as web 4 from the fluid inlet surface of the filter bed onto the contaminated roll 5. The filtrate drainage housing consists of a retaining wall 6, outer shell 7, and top and lower end rings 8, and 9, respectively; and to the outer shell is fastened the filtrate outlet flange 10. The winding cage 11 may be of very open mesh structure and must have at least one slot of sufficient width for passage of the contaminated fabric. The cage, when turning in the direction of the full arrow, engages top and bottom filter bed end flanges 12 and 13 respectively, by means of the friction balls 14 wedging themselves in the slot 15 between the cage and the end flanges; and when turning in the opposite direction, or in the direction of the dotted arrow, the balls are held in position by pins 16 and the end flanges remain stationary. The fluid to be filtered is drawn from pipe 17 by the pump 18, which is driven by motor 19, and forced through pipe 20, swivel joint 21, winding pipe 22, and openings 23, into the space between the winding cage turning plate 24 and the exhausted fabric supporting plate 25, from which it flows through openings 26 in the latter into the central chamber. The winding pipe is supported in position by an annular ring 27, which is welded to the pipe and rotatably recessed into the winding sleeve end plate, the latter being supported by the bottom cover end plate 28, which is bolted to the filter bed lower flange and supported by the filter lower cover plate 29. Leakage, between the lower cover plate and the sleeve of the turning plate is prevented by gland 30; between the sleeve of the turning plate and the winding pipe, by gland 31; and from the swivel joint, by gland 32. The winding cage and filter bed end flanges may be manually turned in the direction of the full arrows, as when building up a filter bed, by wheel 33, which is bolted by stud 34 to the top cover plate 35; and the latter is fastened by bolts 36 to the filter bed top flange. The slot 37 in the winding pipe, is carried to the upper end of the pipe so that the exhausted fabric may easily be removed, the upper end of the pipe being closed by a split annular bushing 38 and held in closed position by the lock nut 39 so that the lower end of the wheel stud may be used for centralizing purposes. The filter rests on legs 40; and the supply roll of fabric is rotatably supported by pipe 41, which is fastened to the pipe stanchion 42. The cylinder 43 for retracting the filter bed housing, is connected, pivotally to the stanchion by a bracket 44; to the pump by a flexible line 45; and to the filtrate drainage housing by piston 46, piston rod 47, eccentric rod 48, lever 49 positioned on the eccentric rod and connected to the piston rod, right hand housing brackets 50 which support the eccentric rod, left hand housing brackets 51, and links 52 pivotly connecting the left hand brackets to the eccentric rod passing through the right hand brackets. Coil spring 53 returns the piston to its original position whenever the pump pressure drops. Pipe 54 may be used to return any leakage from below the winding cage turning plate, or filtrate accumulation resulting from retraction of the drainage housing, back to the pump suction. Closure plate 55 may be used as an additional means for preventing leakage of filtrate through the fabric slot in the housing. Gear 56 is keyed to the sleeve of the winding cage, and is driven by a pinion 57 on the countershaft 58. A worm gear 59, keyed to the countershaft, is driven by a worm 60 on the shaft of the motor 61, which is fastened to a block 62. A ratchet plate 63 is also keyed to the countershaft and when rotating in the direction required for removal of the fabric, is engaged by a pawl 64 pinned to a friction plate 65, which floats on the shaft. A gear 66 is held in contact with the friction plate by a predetermined force controlled by the pressure of a coil spring 67, and when the ratchet plate engages the friction plate the gear is caused to drive the idler 68 which engages the gear 69 on the winding pipe. A fibre cam 70 on the sleeve of the winding cage is used to break the circuit that energizes the motor.

The operation of the apparatus thus constructed has been in part indicated in connection with the foregoing description. When first starting up the filter, the filter bed must be formed. This is accomplished by retracting the drainage housing and thrusting the end of the supply roll through the slots in the housing, winding cage, and winding pipe; and rotating the winding cage in the direction of the full arrow by means of the hand wheel 33, or the motor 61, until the annular space between the retaining wall and winding cage is substantially full, the rotation of the cage carrying the winding pipe with it. The return movement of the retractable drainage housing will cause the ends of the housing to frictionally engage the grooves or threads of the filter bed end flanges, and the liquid to be filtered may then be pumped in through the winding pipe, as explained above, the filtrate passing through the retaining wall into the housing from which it flows through outlet flange 10.

Upon contamination, or clogging, of the surface layers of the filter bed, the pressure in the pump line 20 will rise and cause the pressure switch 76 to close contact 77 connecting lines 78 and 79, which energizes the shaded pole induction motor 80, the latter, through gear box 81 and shafting 82, operating cams 83, 84, 85, 86 and 87. Cam 87, through contact 88 and lines 89 and 90, momentarily starts the filter motor 61 but as soon as a 10 degree gap in the cam 70 has been bridged, contact 91 closes and contact 88 opens thus giving control of the motor 61 to the cam 70, which stops the motor when the winding cage, through countershaft 58, pinion 57, and gear 56, has been caused to complete 350 degrees of its circle of rotation in the direction of the dotted arrow. Simultaneously with the anti-clockwise movement of the winding cage, and through engagements of the countershaft 58, ratchet plate 63, pawl 64, friction plate 65, gear 66, idler 68 and gear 69, the winding pipe has been caused to turn in the opposite direction, thereby winding up the contaminated fabric in the direction of the full arrow as quickly as released from the filter bed by the backward turn of the winding cage. After stopping of the filter motor, the rotation of cam 84 opens contact 92 disconnecting line 93 from the line 94 and 95 and thereby deenergizing the pump motor 19. Dropping of the pump pressure causes the piston 46 in the hydraulic cylinder 43 to be forced back by coil spring 53, thereby causing the filtrate housing to retract to the position shown in Fig. 3. Immediately upon dropping of the pump pressure and retraction of the housing, cam 86 closes contacts 96 and 97 and cam 85 opens contacts 98 and 99 thereby reversing the filter motor 61 by the reversal of the starting winding connections to their respective field winding connections, of lines 100 to 108 inclusive. Upon reversal of these connections the second lobe of cam 87 closes contact 88, and the motor is again placed in operation but in a reverse direction and continues until the winding cage has completed a similar rotative movement to that explained above, but in a clockwise direction, which conveys fresh fabric onto the fluid outlet surface of the filter bed. During this reverse movement of the motor, pawl 64 slips over the ratchet plate 63 and no motion from the motor is imparted to the winding pipe which is therefore rotated with the cage by the frictional contact of the latter. When the cage has rotated 350 degrees, cam 70 opens contact 91 and the motor 61 is stopped and immediately thereafter cam 84 closes contact 92 and the pump motor 19 is started. Cam 83 has now rotated until a point 109 has travelled slightly past contact 110 leaving approximately 160 degrees of rotation for the shaft 82 to make before completing the circle to allow pump 18 to build up pressure in line 20, and force piston 46 to its extreme outward position in cylinder 45 by which time the housing has resumed its normal position. If the removal of one layer of contaminated fabric has been sufficient to reduce the fluid pressure in pipe line 20 to a factor below that necessary to operate pressure switch 76, contact 77 will remain open and the induction motor will stop when contact 110 is opened by cam 83. However, if the removal and addition of more than one layer of the filter bed is required pressure switch 76 will again close contact 77 and the operation cycle will be repeated until the desired operating differential pressure has been obtained.

I claim as my invention:

1. A filtering process comprising: passing a fluid through a filter bed of contiguous layers of filter material supported by a retaining wall; retracting the retaining wall away from the filter bed; moving the filter bed and retaining wall relatively during the said retraction of the retaining wall; and interposing a fresh layer of filter material between the filter bed and retaining wall during the said relative movement.

2. A filtering process comprising: passing a fluid through a filter bed of contiguous layers of filter material supported by a retaining wall; removing the fluid inlet surface layer of the filter bed to provide fresh filtering surface to the said fluid; retracting the retaining wall away from the filter bed; moving the filter bed and retaining wall relatively during the said retraction of the retaining wall; and interposing a fresh layer of filter material between the filter bed and retaining wall during the said relative movement.

3. A filtering process comprising: passing a fluid under a differential pressure through a filter bed of contiguous layers of filter material supported by a retaining wall; removing the fluid inlet surface layer of the filter bed to provide fresh filtering surface to the said fluid; reducing the differential pressure and retracting the retaining wall away from the filter bed; moving the filter bed and retaining wall relatively during the said reduction of pressure and retraction of the retaining wall; and interposing a fresh layer of filter material between the filter bed and retaining wall during the said relative movement.

4. A filtering process comprising: passing a fluid under a differential pressure through a filter bed of contiguous layers of filter material supported by a retaining wall; removing the fluid inlet surface layer of the filter bed during passage of the said fluid through the bed; reducing the differential pressure and retracting the retaining wall away from the filter bed; moving the filter bed and retaining wall relatively during the said reduction of pressure and retraction of the retaining wall; and interposing a fresh layer of filter material between the filter bed and retaining wall during the said relative movement.

5. A filtering process comprising: passing a fluid under a differential pressure through a filter bed of contiguous layers of filter material supported by a retaining wall; removing the fluid inlet surface layer of the filter bed during passage of the said fluid through the bed; reducing the differential pressure and retracting the retaining wall away from the filter bed; moving the filter bed and retaining wall relatively during the said reduction of pressure and retraction of the retaining wall; interposing a fresh layer of filter material between the filter bed and retaining wall during the said relative movement; returning the retaining wall to normal position for supporting the filter bed, and increasing the differential pressure to normal filtering pressure; and passing a further amount of the said fluid under the restored differential pressure through the renewed filter bed.

FRED W. MANNING.